United States Patent [19]

Inada et al.

[11] Patent Number: 5,052,743
[45] Date of Patent: Oct. 1, 1991

[54] OPEN-TOP TYPE VEHICLE ROOF STRUCTURE

[75] Inventors: Yoshinori Inada, Zama; Takehisa Makiyama; Hideo Sekizawa, both of Yokohama, all of Japan

[73] Assignee: Nissan Motor Co., Ltd., Japan

[21] Appl. No.: 423,011

[22] Filed: Oct. 18, 1989

[30] Foreign Application Priority Data

Oct. 20, 1988 [JP] Japan .............................. 63-137100[U]

[51] Int. Cl.⁵ .......................... B60J 10/12; B60J 7/11; B60J 7/19
[52] U.S. Cl. ..................................... 296/210; 296/218; 296/224; 292/DIG. 5; 49/463; 49/493
[58] Field of Search ............... 296/210, 216, 218, 224; 49/463, 466, 493; 292/DIG. 5

[56] References Cited

U.S. PATENT DOCUMENTS

| | | | |
|---|---|---|---|
| 2,556,062 | 6/1951 | Buehrig | 296/218 |
| 4,138,155 | 2/1979 | Chrysler | 296/218 |
| 4,626,026 | 12/1986 | Hasegawa | 296/224 X |
| 4,729,596 | 3/1988 | Fujihara et al. | 296/218 |
| 4,729,597 | 3/1988 | Fujihara et al. | 296/218 |
| 4,821,394 | 4/1989 | Martinez-Vera | 296/218 X |
| 4,869,549 | 9/1989 | Londeck et al. | 296/224 |

OTHER PUBLICATIONS

Nissan Service Bulletin, 1986 Oct., No. 566, p. D-1.

*Primary Examiner*—Margaret A. Focarino
*Assistant Examiner*—Andrew C. Pike
*Attorney, Agent, or Firm*—Leydig, Voit & Mayer

[57] ABSTRACT

An open-top roof structure is assembled by first assembling an inner panel, a reinforcing panel and an outer panel into a roof subassembly which has a roof opening to be closed with a roof lid and which is rigid enough to resist distortion. The subassembly is then joined to the front and rear pillars of the vehicle body in order to improve the dimensional accuracy, the fit, and the watertightness between the roof opening and roof lid. The roof structure further includes a weather strip bordering the roof opening and a roof lid locking member which are both fixed to the roof outer panel with a common bolt.

12 Claims, 5 Drawing Sheets

OPEN-TOP TYPE VEHICLE ROOF STRUCTURE

BACKGROUND OF INVENTION

The present invention relates to body structures of vehicles such as motor vehicles, and more specifically to vehicle roof structures of an open-top type having one or more roof openings closed with one or more roof lids.

FIG. 9A shows a so-called T bar roof, and FIGS. 5-8 show a conventional inside structure of the T bar roof.

As shown in FIG. 7, this roof structure has an H-shaped roof inner assembly 4 which is structurally connected with left and right rear pillars 2 and left and right front pillars 3 of the vehicle body, and an H-shaped roof outer panel 5 which is joined to the inner assembly 4.

At the upper end of each pillar, a roof inner panel 6 of the inner assembly 4 is joined to a front pillar inner panel 7 (or an unillustrated rear pillar inner panel) by spot welding, and a roof reinforcing panel 9 of the inner assembly 4 is joined to a front pillar outer panel 10 (or a rear fender panel 11) by spot welding. After the inner assembly 4 is welded to each pillar, the roof outer panel 5 is joined to the front pillar outer panel 10 (or the rear fender panel 11) by spot welding. Reference numeral 12 denotes an access hole.

As shown in FIGS. 5 and 6, a lock member 13 is fixed to the upper end of each pillar by a bolt 14. Each lock member 13 has a lock hole for receiving a lock bolt 1a for locking the roof lid 1. A similar structure is shown in NISSAN Service Bulletin, 1986 October, No. 566, page D-1, published by Nissan Motor Co., Ltd.

However, this roof structure is disadvantageous because the roof outer panel 5 is joined to the roof inner assembly 4 after the roof inner assembly 4 has been connected to the vehicle body. The roof outer panel 5, however, is low in rigidity, and susceptible to distortion during the assembly process. Therefore, the connection of the roof outer panel 5 to the vehicle body often causes distortion of the roof opening and results in a poor fit of the roof lid, and necessitates an additional cumbersome job to adjust the fit. The poor dimensional accuracy of the roof opening affects not only the fit of the roof lid but also the watertightness of the roof lid.

SUMMARY OF THE INVENTION

It is therefore an object of the invention to provide an open-top type roof structure which is superior in dimensional accuracy, fit and watertightness, and a method for assembling such a roof structure.

According to the present invention, a vehicle body structure comprises a roof assembly having an opening to be closed with a roof lid, a locking means for locking the roof lid, and a weather strip bordering the opening. The roof assembly comprises an inner assembly and a roof outer panel which are joined together to form the roof assembly. The locking means comprises a first lock member which is fixed to the roof outer panel. The weather strip is fixed to the roof outer panel together with the first lock member.

In this structure, the roof outer panel and the inner assembly are assembled into a roof assembly (or subassembly) which is rigid enough to retain the correct shape of the roof opening. Therefore, the roof assembly can maintain the dimensional accuracy and precision of the roof opening. Furthermore, the weather strip and the lock member are fixed to the roof outer panel of the roof assembly. Therefore, it is easy to correctly position the weather strip and the lock member.

DETAILED DESCRIPTION OF THE INVENTION

One embodiment of the present invention is shown in FIGS. 1-4.

Figure 9A:
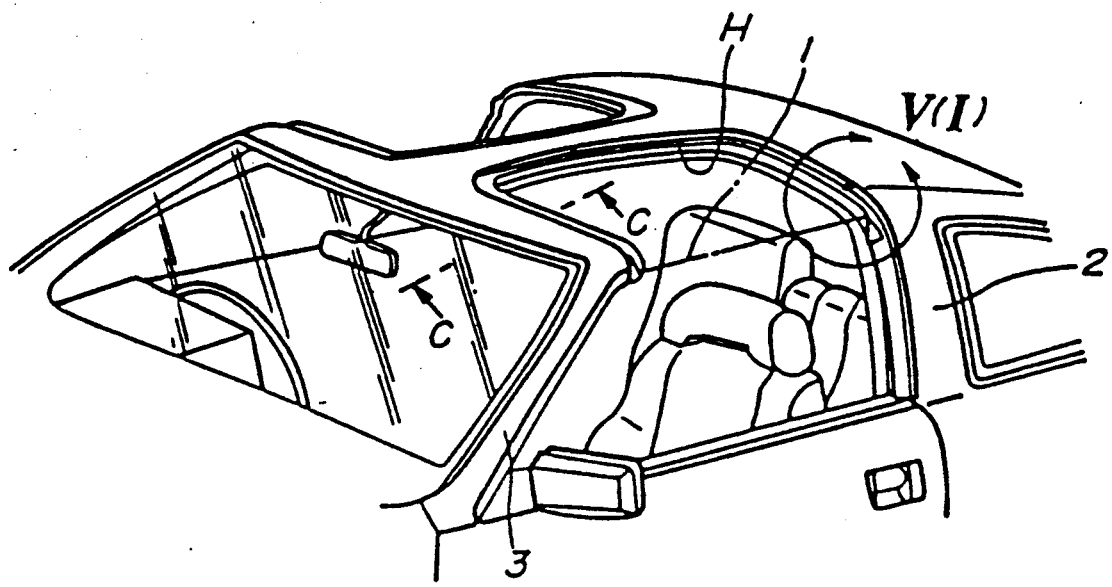
FIG. 9A is a perspective view showing an upper part of a T-bar roof vehicle.
Figure 9B:
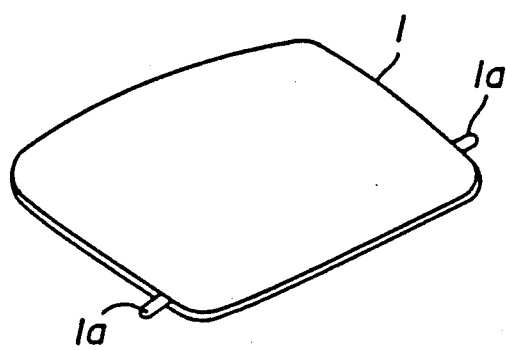
FIG. 9B is a perspective view of a roof lid.

A vehicle roof structure of this embodiment is of the T bar roof type, as shown in FIG. 9A. The roof structure of this type has left and right roof openings H which are separated by a center beam extending along the longitudinal axis of the vehicle body, and which are closed with left and right removable roof lids 1, one of which is illustrated in FIG. 9B. A locking means is provided for locking each lid in the closed state. Examples of the locking means are disclosed in U.S. Pat. Nos. 4,729,596 and 4,729,597, which are incorporated by reference.

Figure 3:
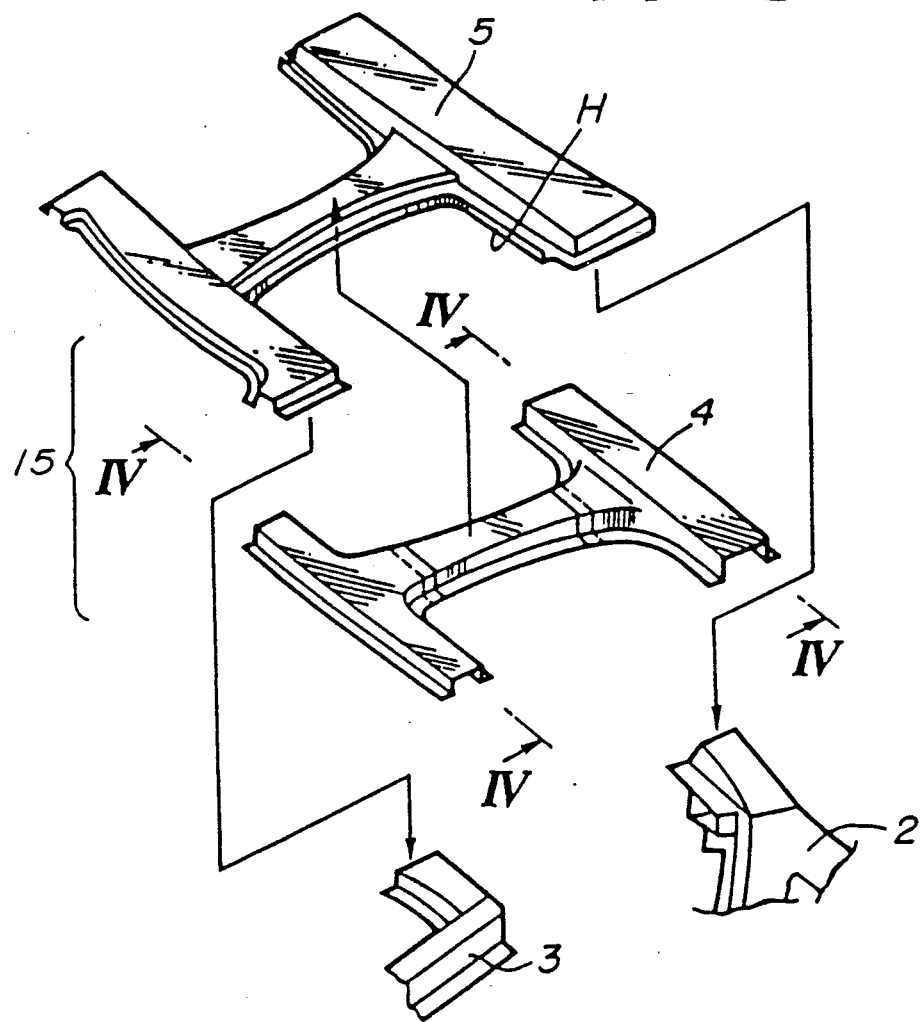
FIG. 3 is an exploded perspective view of a roof assembly according to the present invention.
Figure 4:
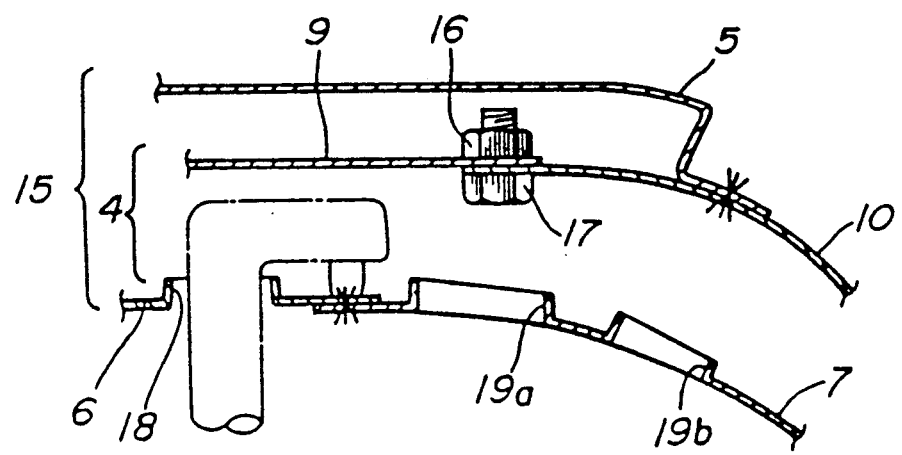
FIG. 4 is a sectional view taken along Line IV—IV of FIG. 3.
Figure 5:
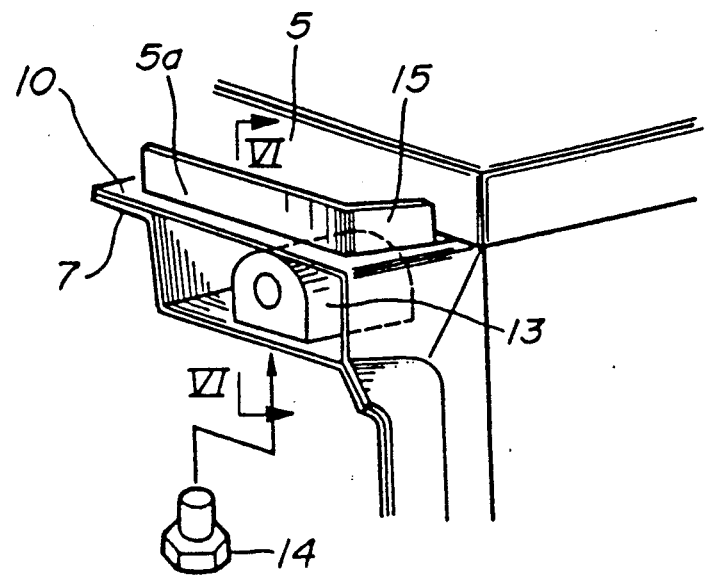
FIG. 5 is a perspective view of region V of FIG. 9, showing the structure of a conventional vehicle roof.
Figure 6:
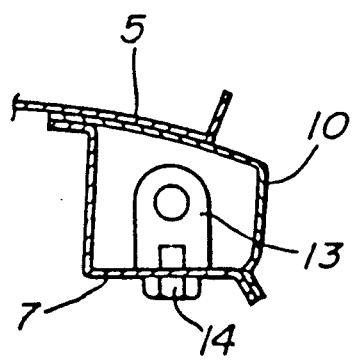
FIG. 6 is a sectional view of a mount portion taken along Line VI—VI of FIG. 5.
Figure 7:
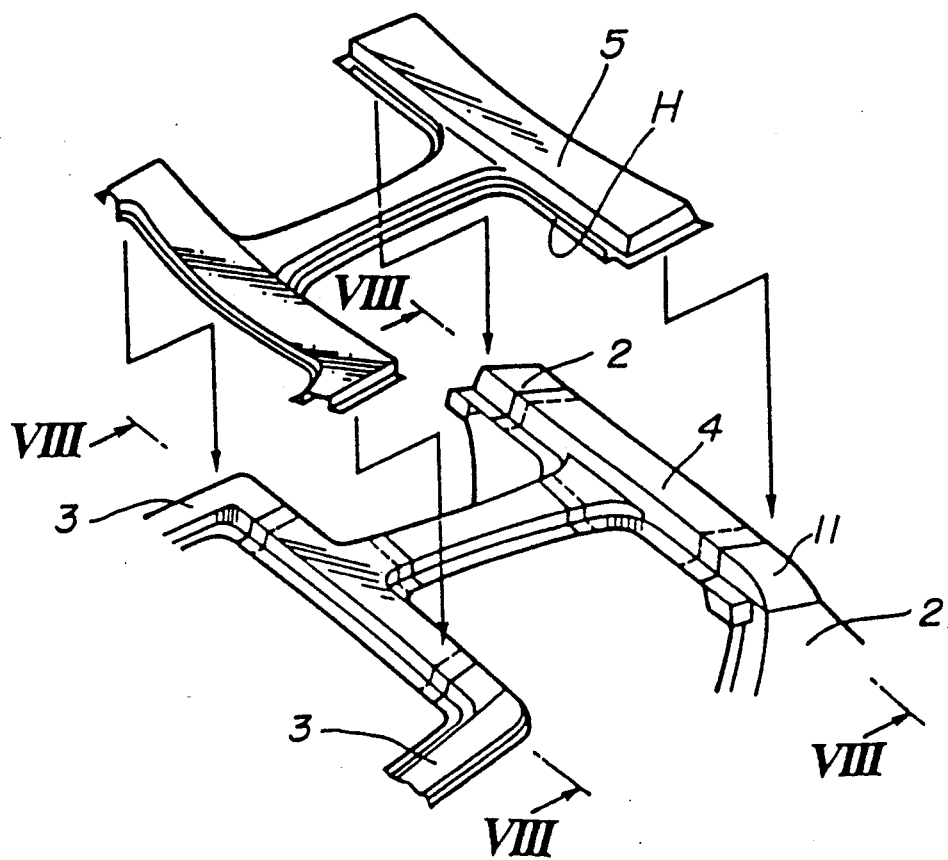
FIG. 7 is an exploded perspective view of a conventional roof assembly.
Figure 8:
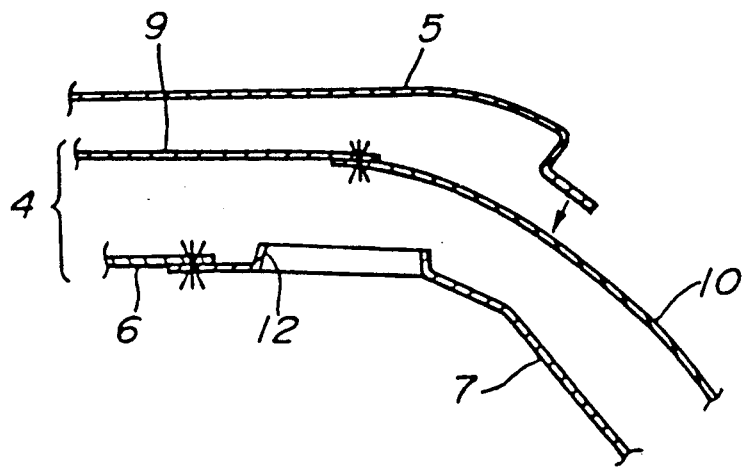
FIG. 8 is a sectional view taken along line VIII—VIII of FIG. 7.
Figure 9C:
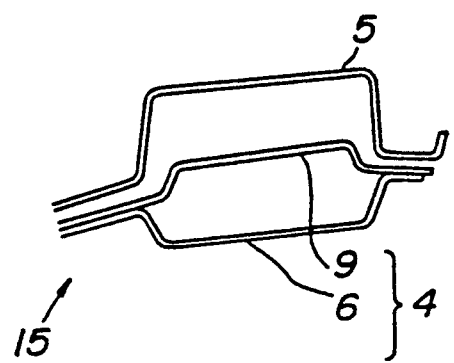
FIG. 9C is a schematic cross-sectional view taken along line C—C of FIG. 9A.

As shown in FIGS. 3 and 4, the roof frame structure of this embodiment includes an H-shaped roof assembly 15 which is fixed to top ends of left and right rear pillars 2 and left and right front pillars 3 of the vehicle body. The H-shaped roof assembly 15 includes an H-shaped roof inner assembly 4, and an H-shaped roof outer panel 5 disposed over the inner assembly 4. The roof inner assembly 4 has a roof inner panel 6 and a reinforcing panel 9 disposed between the roof inner panel 6 and the roof outer panel 5. The roof outer panel 5 covers the reinforcing panel 9. The roof outer panel 5 and the inner assembly 4 are preliminarily joined together to form the roof assembly 15. FIG. 9C, which is a cross-sectional view taken along Line C-C of FIG. 9A, schematically illustrates the connection between the roof outer panel 5 and the roof inner assembly 4. After the H-shaped roof assembly 15 is formed by joining the outer panel 5 to the inner assembly 4, the roof assembly 15 is fixed to the rear pillars 2 and the front pillars 3. Each front pillar 3 includes a front pillar inner panel 7 and a front pillar outer panel 10, and each rear pillar 2 includes an unillustrated rear pillar inner panel and a rear fender panel 11 which serves as a rear pillar outer panel.

The H-shaped roof assembly 15 has front and rear portions extending substantially parallel to each other and to the lateral axis of the vehicle body, and a center beam portion extending along the longitudinal axis of the vehicle body from the middle of the rear portion to the middle of the front portion so as to form the shape of an H.

Each of the left and right ends of the front and rear portions of the H-shaped roof assembly 15 is fixed to the top end of the front or rear pillar 3 or 2 as shown in FIG. 4. In each end of the front and rear portions of the roof assembly 15, at least one weld nut 16 (or at least one weld bolt) is preliminarily fixed to the reinforcing member 9 by welding. The upper end of the front pillar outer panel 10 (or the rear fender panel 11) is fastened to the outboard end of the reinforcing member 9 of the roof assembly 15 by joining means for forming a lap joint, the joining means comprising the weld nut 16 (or the weld bolt) and a bolt 17 screwed into the weld nut 16 (or a nut screwed onto the weld bolt). The outboard end of the roof inner panel 6 of the roof assembly 15 is joined to the upper end of the front pillar inner panel 7 (or the rear pillar inner panel) by spot welding. The outboard end of the roof outer panel 5 of the roof assembly 15 is joined to the upper end of the front pillar outer panel 10 (or the rear fender panel 11) by spot welding. In this way, the roof inner panel 6, the reinforcing panel 9 and the roof outer panel 5, which are already in the form of the roof assembly 15, are joined to the rear and front pillars 2 and 3 of the vehicle main body.

Each outboard end of the roof inner panel 6 is formed with at least one access hole 18 for spot welding. The upper end of each of the front pillar inner panels 7 and the rear pillar inner panels is formed with at least one first access hole 19a for tightening the bolt 17, and at least one second access hole 19b for spot welding.

Figure 1:
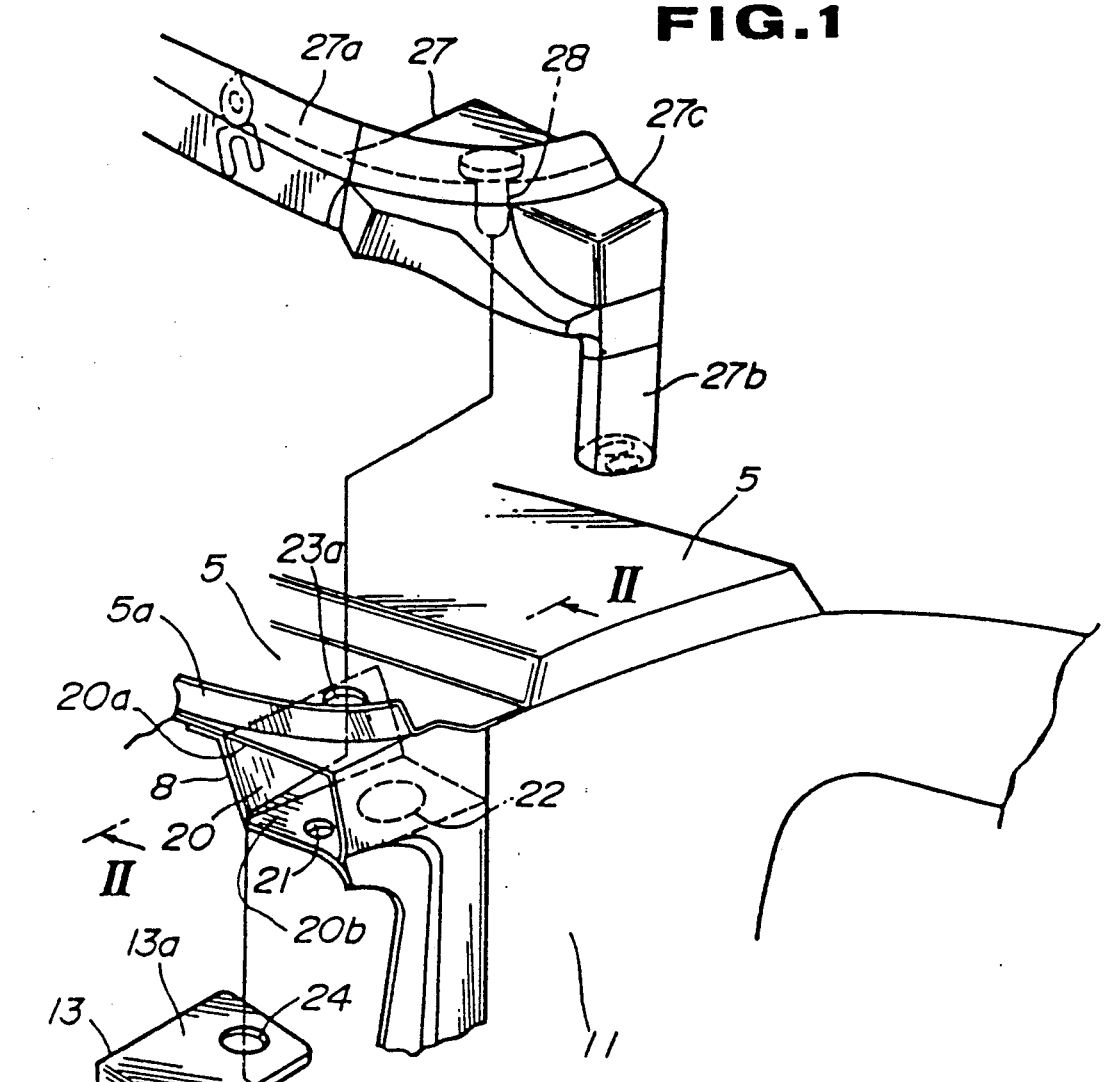
FIG. 1 is an exploded perspective view of region I of FIG. 9, showing the structure of an embodiment of the present invention.
Figure 2:
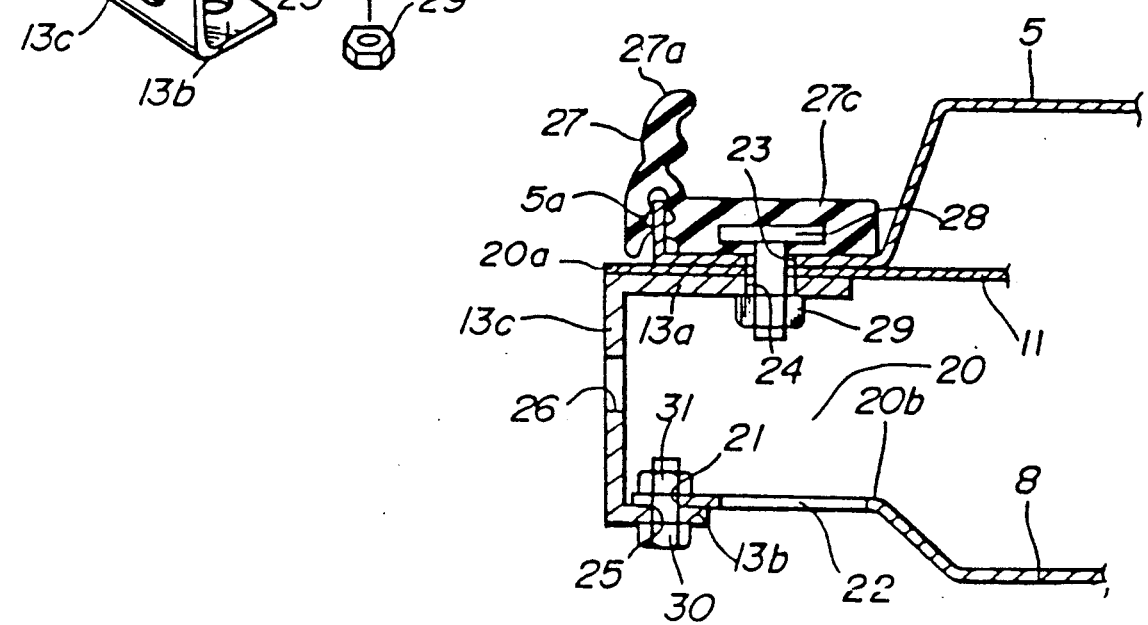
FIG. 2 is a sectional view taken along Line II—II of FIG. 1.

A lock member 13 shown in FIGS. 1 and 2 is a component of the locking means provided between each roof lid 1 and the roof frame structure for locking the roof lid. One lock member 13 is provided in each end of the front and rear portions of the roof assembly 15 under the roof outer panel 5.

As shown in FIG. 9B, each roof lid 1 has a movable front lock bolt 1a which can project forwardly from the front outboard corner of the lid 1, substantially in parallel to the longitudinal line of the vehicle body (when the lid 1 is in the closed position), and a movable rear lock bolt 1a which can project rearwardly from the rear outboard corner. The front and rear lock bolts 1a of each lid 1 are linked with each other so that the front and rear lock bolts 1a can be projected simultaneously from the lid in the opposite directions. Each of the lock members 13 is a female member having a lock hole 26 for receiving one of the lock bolts 1a of the roof lids 1. FIGS. 1 and 2 show the rear left lock member 13 for receiving the rear lock bolt 1a of the left roof lid 1. All four lock members 13 are fixed to the vehicle body substantially in the same manner.

As shown in FIGS. 1 and 2, the rear left lock member 13 is fixed to a mount portion 20 which is constituted by a rear pillar inner panel 8 and the rear fender panel 11. The mount portion 20 has upper and lower walls 20a and 20b which are substantially horizontal, and inboard and outboard side walls extending substantially vertically between the upper and lower walls 20a and 20b. The mount portion 20 is therefore shaped like a box. The upper wall 20a of the mount portion 20 is a part of the rear fender panel 11. An end portion of the roof outer panel 5 is disposed over the upper wall 20a, which is formed by the rear fender panel 11. The lower wall 20b of the mount portion 20 is a part of the rear pillar inner panel 8.

The lower wall 20b of the mount portion 20 is formed with a first lower hole 21 and a second lower hole 22. The boxlike mount portion 20 has a front side which faces toward the front of the vehicle and which is open. The first hole 21 is closer to the open front side than the second hole 22. In this embodiment, both holes 21 and 22 are circular, and the second hole 22 is larger than the first hole 21. The upper wall 20a is formed with an upper hole 23a, and the roof outer panel 5 is formed with a hole 23b which is aligned with the upper hole 23a so as to form a single continuous upper hole 23 into which a single bolt can be inserted.

The lock member 13 has upper and lower walls 13a and 13b which are substantially horizontal in the assembled state, and one side wall 13c extending between the upper and lower walls 13a and 13b. The side wall 13c is substantially vertical and faces toward the front of the vehicle in the assembled state. The lock member 13 is shaped like the letter U with three walls 13a, 13b and 13c. The upper wall 13a of the lock member 13 is disposed under the upper wall 20a of the mount member 20 and is formed with an upper hole 24 which is aligned with the upper hole 23 of the mount portion 20 in the assembled state. The lower wall 13b of the lock member 13 is formed with a lower hole 25 which is aligned with the first lower hole 21 of the mount portion 20 in the assembled state. The side wall 13c of the lock member 13 is formed with a lock hole 26 for receiving the rear lock bolt of the roof lid 1.

Each of the left and right roof openings H is fringed with an upward flange 5a on an upper surface of the roof outer panel 5, and weather strip 27 is disposed on the upper surface of the roof outer panel 5 and attached to the upward flange 5a. Each of the weather strips 27 has a roof seal lip 27a which projects upwardly, and which extends, together with the upward flange 5a, along the border of the roof opening H. FIGS. 1 and 2 show one end of the weather strip 27 provided around the left roof opening H. As shown in FIG. 1, the end portion of the weather strip 27 has a corner portion 27c and a door seal lip 27b. The door seal lip 27b extends downwardly from the corner portion 27c along the border of the opening of the vehicle body which is closed with a door. The corner portion 27c is formed by die molding, and a head of a bolt 28 is embedded in the corner portion 27c during the molding process. The bolt 28 projects downwardly from the underside of the corner portion 27c.

The bolt 28 of the weather strip 27 is inserted through the upper hole 23 formed in the roof outer panel 5, through the upper wall 20a of the mount portion 20, and through the upper hole 24 of the lock member 13, and a nut 29 is screwed onto the bolt 28 from below. The lower wall 13b of the lock member 13 is fastened to the lower wall 20b by a bolt 30 which is inserted through the lower hole 25 of the lock member 13 and through the first lower hole 21 of the mount portion 20, and a nut 31 is tightened on the bolt 30. In this way, the lock member 13 is fixed to the mount portion 20 by the bolt and nut 28 and 29 and the bolt and nut 30 and 31. The weather strip 27 is fixed, together with the upper wall 13a of the lock member 13, to the upper wall 20a of the mount portion 20 and the roof outer panel 5 by the bolt and nut 28 and 29.

The three other lock members 13 are fixed to the front left corner, front right corner and rear right corner, respectively, of the roof frame structure in substantially the same manner.

In this embodiment, the roof structure is assembled by first assembling the roof inner panel 6, the roof reinforcing panel 9 and the roof outer panel 5 into the rigid roof assembly 15, and then joining the roof assembly 15 to the front and rear pillars of the vehicle body. Therefore, the final roof frame structure is accurate and without dimensional errors. In particular, the roof outer panel 5 is not joined alone to the vehicle body but is incorporated into the roof assembly 15. Therefore, the roof outer panel 5, which is important to the accuracy of the roof opening, can be assembled correctly and accurately without being affected by dimensional errors of the vehicle body.

The weather strip 27 is attached to the flange 5a of the roof outer panel 5, which is positioned correctly. Therefore, the weather strip 27 can abut against the roof lid 1 correctly and ensure the watertightness of the roof lid 1. The lock member 13 is also attached to the roof outer panel 5. Therefore, it is easy to locate the lock member 13 in the correct position.

The present invention is not limited to a T bar roof but is applicable to open-top roofs or sun roofs of various other types.

What is claimed is:

1. A vehicle body structure comprising:
    a roof assembly comprising an inner assembly and a roof outer panel joined to said inner assembly, said roof assembly having an opening to be closed with a roof lid;
    locking means for locking said roof lid, said locking means comprising a first lock member fixed to said roof outer panel;
    a weather strip bordering said opening; and
    a fastener that fastens said first lock member and said weather strip to said roof outer panel.

2. A vehicle body structure according to claim 1 wherein said inner assembly comprises a roof inner panel and a reinforcing panel, the reinforcing panel being disposed between said roof inner panel and said roof outer panel.

3. A vehicle body structure according to claim 2 further comprising a pillar comprising a pillar outer panel and a pillar inner panel, wherein said roof outer panel has an end which is joined to an upper end portion of said pillar outer panel, said reinforcing panel has an end which is joined to said upper end portion of said pillar outer panel, and said roof inner panel has an end which is joined to an upper end of said pillar inner panel.

4. A vehicle body structure according to claim 3 wherein said end of said reinforcing panel is covered with said roof outer panel, the vehicle body structure further comprising joining means for forming a lap joint between said end of said reinforcing panel and said upper end portion of said pillar outer panel even when one side of the panels is inaccessible.

5. A vehicle body structure according to claim 4 wherein said joining means comprises a weld nut welded to one of said reinforcing panel and said pillar outer panel, and a bolt screwed into said weld nut.

6. A vehicle body structure according to claim 3 wherein said weather strip is disposed on an upper surface of said roof outer panel, said first lock member is disposed under said roof outer panel, and said fastener comprises a bolt extending from said weather strip and passing through bolt holes formed in said roof outer panel and said first lock member.

7. A vehicle body structure according to claim 6 wherein said pillar has a mount portion having upper and lower walls, said first lock member has upper and lower walls, said roof outer panel is disposed over said upper wall of said mount portion, said upper wall of said first lock member is disposed under said upper wall of said mount portion, said bolt of said fastener passes through a bolt hole formed in said upper wall of said mount portion, and said lower wall of said first lock member is fastened to said lower wall of said mount portion.

8. A vehicle body structure according to claim 7 wherein said bolt has a head embedded in said weather strip.

9. A vehicle body structure according to claim 8 wherein said first lock member has a side wall extending substantially vertically between said upper and lower walls of said first lock member and has a lock hole for receiving a lock bolt extending along a longitudinal axis of a vehicle body.

10. A vehicle body structure according to claim 9 wherein said lower wall of said mount portion has an access hole lying below said bolt holes of said roof outer panel and said upper wall of said mount portion.

11. A vehicle body structure according to claim 10 wherein said upper wall of said mount portion is a part of said pillar outer panel, and said lower portion of said mount portion is a part of said pillar inner panel.

12. A vehicle body structure according to claim 3 wherein said roof inner panel, said reinforcing panel, and said roof outer panel are joined to said pillar by a first step of joining said outer panel to said inner assembly to form said roof assembly and a second step of joining said roof assembly to said pillar.

* * * * *